W. WALKER.
Machine for Pressing or Creasing Ruffled Fabrics.

No. 225,667. Patented Mar. 16, 1880.

WITNESSES:

INVENTOR:

UNITED STATES PATENT OFFICE.

WILLIAM WALKER, OF BROOKLYN, ASSIGNOR TO EMIL S. LEVI, OF NEW YORK, N. Y.

MACHINE FOR PRESSING OR CREASING RUFFLED FABRICS.

SPECIFICATION forming part of Letters Patent No. 225,667, dated March 16, 1880.

Application filed August 11, 1879.

*To all whom it may concern:*

Be it known that I, WILLIAM WALKER, of the city of Brooklyn, in the county of Kings and State of New York, have invented certain new and useful Improvements in Machines for Pressing or Creasing and Applying Bands to Fluted, Crimped, Plaited, or other Ruffled Fabrics; and I do hereby declare that the following is a description of the same, reference being had to the accompanying drawings.

The machine to which this invention relates is more especially designed for pressing down the flutes of fluted or ruffled fabrics on a line or between lines parallel with the edges of the fabric and applying a band thereto.

My invention consists in a novel combination of band supports and guides with pressure-rollers; also, in a novel combination of an automatic cutter with such pressure-rollers and band-supports.

Figure 1:
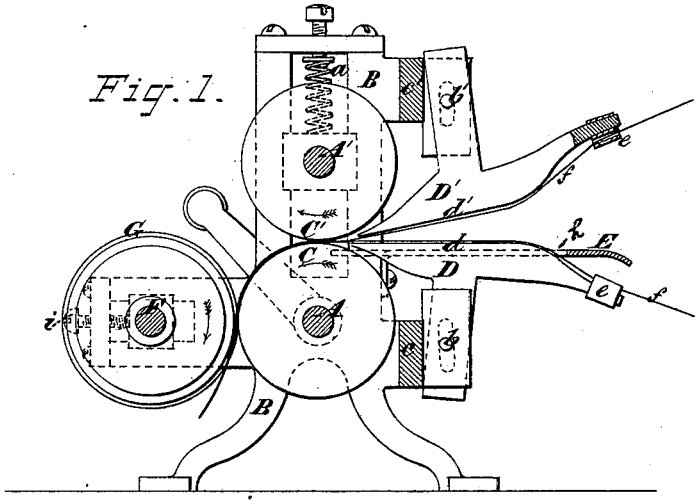
Figure 2:
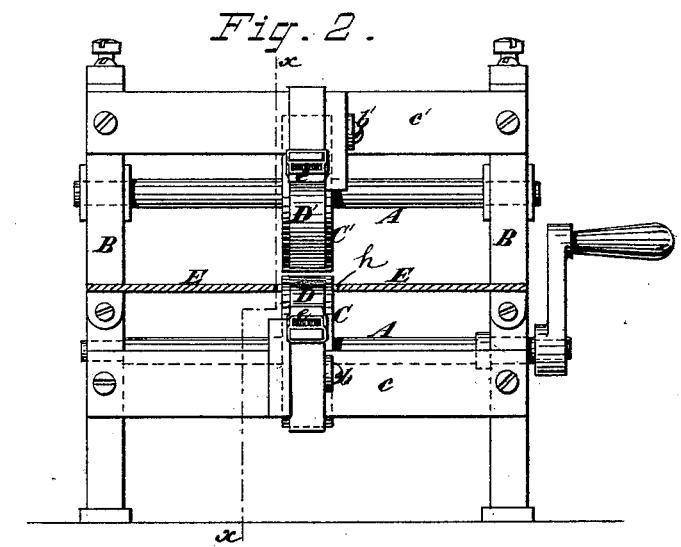
Figure 3:
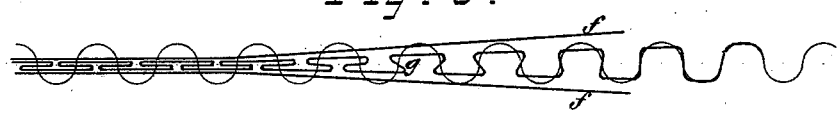
Figure 4:
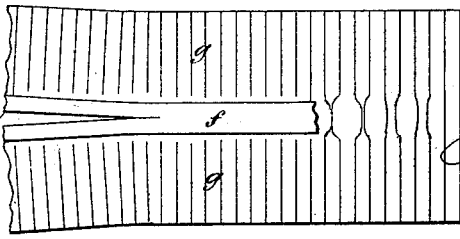

Figure 1 is a sectional elevation of a machine with my improvements, taken parallel with the direction in which the fabric runs through the machine in the planes indicated by the lines $xx$ of Fig. 2, which is a front elevation of the machine with the table in section. Fig. 3 is a longitudinal sectional diagram of the fluted fabric and the bands on a larger scale than Figs. 1 and 2, illustrating the act of pressing down the flutes. Fig. 4 is a face view of the fabric.

B is the main framing of the machine. A is the main shaft, to which the power to drive the machine may be imparted in any well known or suitable manner. This shaft works in fixed bearings and carries the lower roller, C, of the pair C C', the upper one of which is fast upon a shaft, A', which is arranged in bearings, to which are applied springs $a$, for the purpose of pressing the roller C' downward and producing the necessary pressure on the fabric passing between them. These rollers may be heated by gas or other suitable means. Their shafts A A' may be geared together, or the roller C' may be driven by the friction of the fabric passed between it and the roller C.

D D' are converging band-supports, arranged in front of the rollers C C'. These supports consist of plates or blocks of a width not less than the width of the bands $ff$, which are to be applied to the fabric, and their operating-faces $d\ d'$, which converge toward the opening between the rollers and come very near to each other and to the rollers, may be either straight or slightly curved. The faces are shown in Fig. 1 as straight for the greater portion of their length from the ends next the rollers, but having their front parts curved. The said band-supports are firmly and rigidly secured to the machine. They are represented as secured by means of screws or screw-bolts $b\ b'$ to lugs provided with transverse bars $c\ c'$, forming parts of the framing of the machine; but slots are provided in them to permit of their adjustment nearer together or farther apart on the said screws or screw-bolts being slackened, when the degree or angle of convergence of the said supports may be changed, if desired. Each of the said supports has secured to or provided on it a guide, $e$, for the band $f$ which it is to support, the guide on the upper support, D', being on the under side thereof, and the guide on the under support, D, being on the upper side thereof.

Just below the face of the lower band-support, D, is a table, E, for the support of the ruffle $g$ on opposite sides of the band-supports D D', and outside of the portion to which the bands $ff$ are to be applied. The lower band-support, D', is arranged within a slot, $h$, provided in the said table, as shown in Fig. 2.

The bands may be supplied to the machine from reels, suitably supported and arranged, and the ruffle may be supplied from a basket on the floor, or from any other convenient means of containing it in sufficient length.

The operation of creasing by this machine is as follows: The ends of the two bands $ff$ are passed through the guides $e\ e$, and thence between the supports D D' and the pressure-rollers C C', and the end of the ruffle to be creased is laid upon the table E and pushed in between the bands as far as possible toward the pressure-rollers. The machine being set in motion, the bands and the ruffle together are drawn between the band-supports D D' and the pressure-rollers, and as the bands and the ruffle pass together between the converging faces of the supports D D', which form an open and unobstructed taper throat or passage, the flutes of the ruffle are gradually pressed or creased and flattened on the line of the pressure or crease until they arrive between the pressure-rollers, which complete the pressing and flattening.

The bands moving with the ruffle prevent the flutes from falling or being pressed over altogether forward or backward, and insure their being so crushed as to fall equally in both directions, as shown in the diagram, Fig. 3, where the original rounded form of the flutes, as the fabric $g$ enters the machine, is shown by a light line, and the gradual and regular change to the flat form is illustrated by a stronger line.

In this operation the perfect action of the bands is insured by the converging supports D D', which are in fact the means of breaking down and flattening the flutes, the bands only serving to protect the flutes from being broken down or thrown over all in one direction, and afterward serving to retain the crease in its flat condition.

To provide for sticking the bands $f f$ on the ruffle, they may, before entering the machine, be moistened in any suitable manner with starch, gum, or other adhesive material, though, in most cases, the material of which the ruffle and band are composed contains so much starch or dressing that the band, being simply moistened with water, will be caused, by the pressure of the rollers C C', to adhere to the ruffle.

Behind the rollers C C' there is arranged, in suitable bearings on the framing B, a shaft F, on which is secured a circular disk-cutter, G, occupying such a position that the cutting-edge of the disk will be opposite to the crease of the pressed ruffle, and in close proximity or contact with the periphery of the roller C, provision being made for its adjustment up to the said roller by set-screws $i$, applied to the boxes of the shaft F, as shown in Fig. 1. The fabric passing between the roller C and cutter G will be carried forward by the movement of the said roller, and will be cut by the rotary movement of the cutter derived from the said roller by the contact of the said cutter with the fabric or with the said roller.

In case it should be desired to apply a band to the upper surface only of the fabric, the lower band-support, D, may be dispensed with, and the table may be made without the slot shown as provided for said support.

I claim—

1. The combination, with the pressure-rollers and upper and lower band-supports converging toward the opening between the said rollers, of a band-guide on the under face of the upper band-support and a band-guide on the upper face of the lower band-support, substantially as and for the purpose specified.

2. The automatic rotary disk-cutter G, in combination with the pressure-rolls C C' and the converging band-supports D D', substantially as and for the purpose herein described.

WM. WALKER.

Witnesses:
 FREDK. HAYNES,
 T. J. KEANE.